United States Patent Office 3,302,346
Patented Feb. 7, 1967

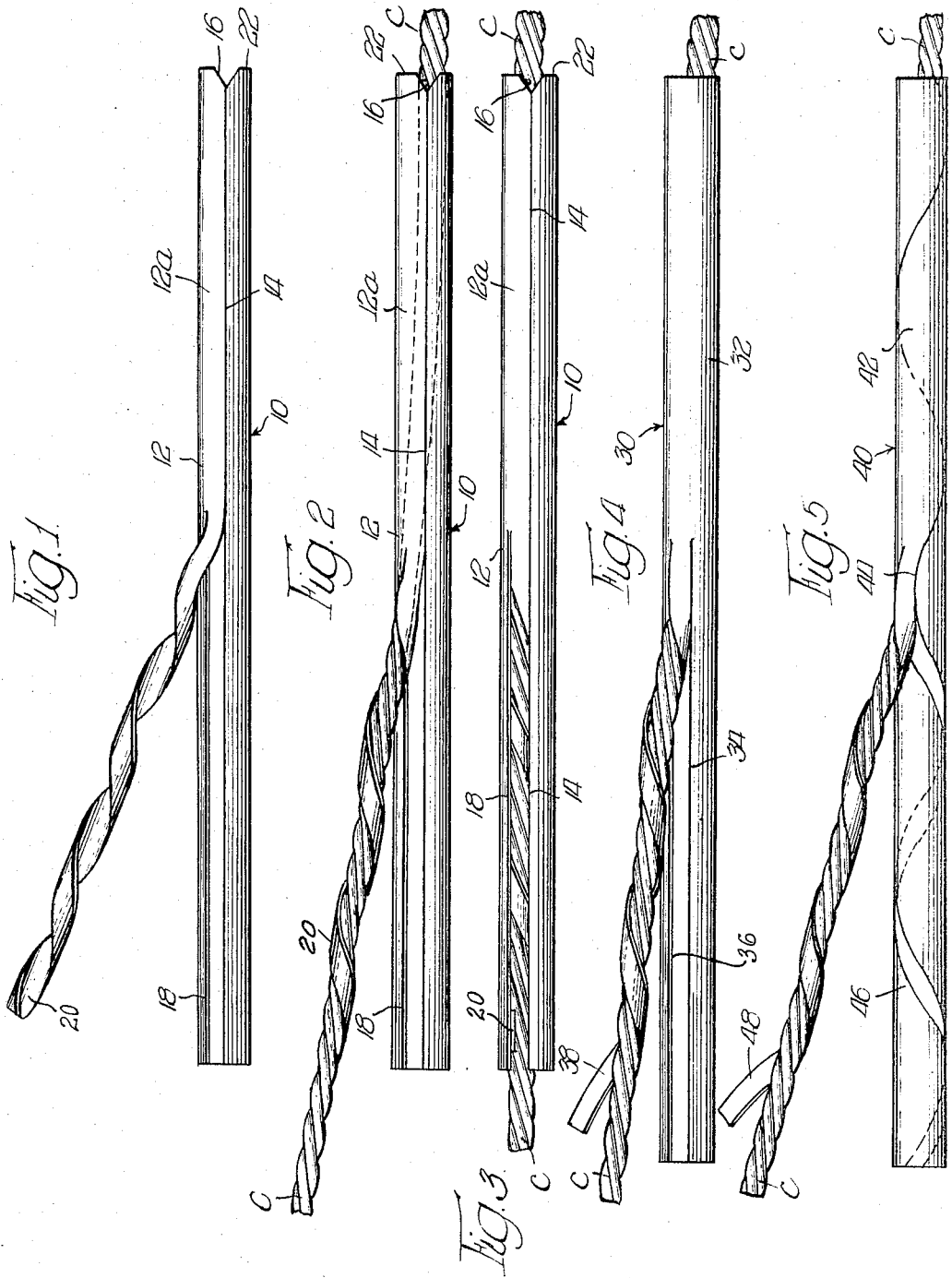

3,302,346
APPLIANCE FOR LINEAR BODIES
Harrison L. Williams, Euclid, and Detre M. G. Banhidy, Cleveland, Ohio, assignors to Preformed Line Products Company, Cleveland, Ohio, a corporation of Ohio
Filed May 21, 1963, Ser. No. 281,887
8 Claims. (Cl. 52—147)

This invention pertains to an appliance for linear bodies such as conductors, cables, guy wires and the like and more specifically comprises a guard member which surrounds the linear body so as to isolate the same from adjacent structures and also can be used to signal the presence of the guy wire.

It has been proposed previously to provide a tubular body which is adapted to be placed over a suspended linear body such as an elecrtical conductor or a guy wire for purposes of protecting or identifying the same. The tubular body is generally fashioned to an internal diameter substantially greater than the external diameter of the linear body of application. Some examples of such tubular bodies are found in the following patent and applications for patent: Sullivan, 3,089,567; Stirn, Serial No. 239,939, filed November 26, 1962, entitled, Appliance for Linear Bodies, and now Patent No. 3,251,161.

The subject invention provides means for protecting or for indicating the presence of a suspended line and constitutes an improvement over similar devices utilized heretofore for the same purposes in that it consists of a unitary structure which includes a tubular body adapted to isolate the line from surrounding structures or to identify the same. The invention may be briefly described as a tubular body having a pair of separate slits longitudinally extending for a portion of the length of the tubular body. The portion of the tubular body intermediate the spaced slits is adapted to be wrapped around said linear body into gripping relationship therewith. As a result the tubular body is prevented from moving along the longitudinal extent of the linear body.

A foremost feature and object of the invention is to provide a protector for a suspended line consisting of a substantially unitary structure. Another feature and object of the invention resides in the provision of a tubular protector for a suspended line in which a portion of the tube is utilized as means for fixing the tube relative to the line. A still further feature and object of the invention resides in the provision of a protector of a simplex construction which may be easily mounted.

The above features and objects along with others will be apparent upon reading of the specification with reference to the following drawing.

FIGURE 1 is an elevational view of the protector embodying the invention;

FIGURE 2 is an elevational view illustrating the application of the appliance to linear bodies;

FIGURE 3 is an elevational view disclosing the appliance as mounted on a linear body;

FIGURE 4 is a modification of the appliance; and

FIGURE 5 is an elevational view of a second modification of the invention.

Before proceeding with a description of the invention it should be understood that the appliance may be constructed of any suitable material which will permit it to perform in the manner intended. It has been found that certain plastic materials having at least limited amounts of flexibility and are abrasion resistant are particularly suited for this use. One example of such plastic material is polyvinyl chloride which is commonly called PVC. The additional advantage of plastic materials such as PVC is that they may be permanently colored thus enabling them to be used for signaling the presence of the line of association.

Referring now to FIGURE 1 there is shown one embodiment of the appliance form of the appliance in the invention. The appliance is generally denoted by the numeral 10 and includes a tubular body 12. The tubular body is preferably of an internal diameter which is substantially greater than the diameter of the conductor C to which it is applied as can be seen in FIGURES 2 and 3. In this manner when the tubular body 12 is applied to the conductor C, the former completely encircles the latter. Thus the tubular body completely isolates the conductor so as to prevent contact of the same with extraneous structures such as trees, buildings, or even the adjacent supporting structures.

The appliance includes a slit 14 which extends throughout the length of the tubular body 12. At one end the slit 14 may terminate in a V-shaped notch 16 so as to facilitate application of the appliance 10 onto a conductor C.

The tubular body is further provided with a second slit 18 which is substantially parallel with the slit 14 as shown in FIGURE 1. The slit 18 is closely spaced to the slit 14 and defines a relatively narrow strip 20 of the tubular body which extends for a portion of the latter's length.

The strip 20 is helically formed for the most part of its length to an open pitch and internal diameter. When helically formed, the strip 20 may be wrapped around the conductor C as shown in FIGURE 2. When wrapped around the conductor C, the strip 20 tightly grips the same so as to prevent longitudinal movement of the tubular body 12 relative to the conductor C. As will be apparent later on, the helical configuration of the strip C may take any one of several forms. Firstly, it may be pre-shaped, that is helically shaped prior to application of the appliance to the conductor. In this manner the tube 12 is then placed on the conductor and the pre-shaped strip 20 is wrapped around the conductor into the aforementioned tightly gripping relationship. It is also conceivable that the strip may be unformed prior to application of the appliance and wrapped around the conductor at the time of application into a helical configuration. This latter method may be somewhat limited in the magnitude of the gripping force exerted by the strip on the linear body. While the strip 20 is shown as being formed to a helix of open pitch and internal diameter, it will be understood that this is merely by way of example. The strip may also be pre-shaped into a closed helix.

Referring now to FIGURES 2 and 3 there are shown the various stages of application of the appliance to the conductor. The first stage of application is to place the portion 12a of the tube 12 intermediate the strip 20 and the end 22 on the conductor C. This may be accomplished by wedging the conductor C into the V-shaped notch 16 and progressively forcing the tube onto the conductor C until it has reached the portion of the slit 14 co-extensive with the slit 18. The tube 12 is then canted so that the conductor C lies within the portion 12a of the tube 12 and extends out through the space intermediate the slits 14 and 18. The strip 20 is flexed outwardly as shown in FIGURE 2 and is wrapped around that portion of the conductor C adjacent the tube 12. When the wrapping is completed the end 24 of the tube 12 is forced upwardly so that the conductor C and the helical strip 20 are moved within the interior of the tube 12 as shown in FIGURE 3. When this happens the conductor C is in an idealized form is in a substantially co-axial relationship with the tube 12. Furthermore the portion of the strip 20 wrapped around the conductor C is also substantially co-axial with the tube 12.

In the preferred form, the space intermediate the slits 14 and 18 is substantially less in width than the diameter of the conductor C or at least the combined diameter of the conductor C with the strip 20 wrapped therearound. Thus in order for the conductor C to be forced into tube 12 or withdrawn from the same through the space intermediate the slits 14 and 18, the sides of the tube must be resiliently expanded. Thus once the conductor is disposed within the entire length of the tube the latter will not become inadvertently withdrawn from the tube from the space intermediate the slits into a condition such as that shown in FIGURE 2.

Referring now to FIGURE 4 there is shown a modification of the invention generally denoted by the numeral 30. The modification comprises a tube 32 having a pair of slits 34 and 36 which are substantially co-extensive and extend for only a part of the length of the tube 32. The slits 34 and 36 define a strip 38 which has been helically shaped as described previously. When the tube 32 is mounted on conductor C the strip 38 is adapted to be wrapped around the same into gripping relationship so as to prevent relative longitudinal movement. It is apparent that since a portion of the tube 32 is not slitted that the appliance 30 may not be applicable to suspended lines. Specifically, the line must be threaded through the portion of the tube C which is not slit. After it has been threaded the tube 32 may be canted similar to that shown in FIGURE 2 so as to facilitate the wrapping of the tube strip 38. The operation of the appliance 30 is substantially the same as that shown in FIGURE 1.

Referring now to FIGURE 5 there is shown a second modification of the invention generally denoted by the numeral 40 and which includes a tube 42. The tube 42 is provided with a first helical slit 44 which extends throughout its length. The tube 42 includes a second slit 46 which is closely spaced 44 and generally conforms thereto. The strip 48 intermediate the slits while being initially of a helical configuration has been further formed to a helix of a smaller internal diameter so that it may be placed in a gripping relationship with a conductor C.

The tube 42 may be applied by first placing the portion of the tube intermediate the strip 48 and the end 50 on the conductor C. This may be accomplished by longitudinally forcing the conductor C into the slit 44 all the while rotating the tube 42. When this has been accomplished the portion of the tube including the second slit 46 is then unwound from the conductor C. The strip 48 is then wrapped around the conductor into the tightly gripping relationship and the remainder of the tube is then in turn wrapped around the conductor C until the entire tube 42 is co-axial therewith. The function of the construction shown in FIGURE 5 is substantially the same as those embodiments described previously.

It can now be seen that the subject invention provides a tubular protector for suspended lines consisting generally of a single element. The tubular member isolates the conductor C so as to prevent engagement with extraneous structures which might otherwise damage the same. As a result of the integral relationship between the fastening means and the tubular portion of the appliance there is little danger of separation between the two so as to prevent displacement of the tubular portion. Furthermore, the difficulties sometimes encountered in the joining of a fastening means to the tubular portion are substantially eliminated.

Although certain specific forms of the invention have been shown and described herein, it is to be understood that these are merely exemplary and not to be construed as limitations. It will be apparent to those skilled in the art that certain modifications may be made within the scope of the claims without departing from the spirit of the invention.

What is claimed is:

1. An appliance for linear bodies comprising a tubular body adapted to be mounted in a co-axial relationship of a linear body for at least a portion of their respective lengths, said tubular body including two spaced slits extending for a portion of its length, at least one of said slits terminating at a point intermediate the ends of said tubular body, an integral portion of said tubular body intermediate said slits being helically formed to an internal diameter and pitch length to permit wrapping around a linear body, said intermediate portion being adapted to be wrapped around a linear body into gripping relationship therewith.

2. The invention comprising a linear body, and a tubular body mounted in co-axial relationship with said linear body for at least a portion of their lengths, said tubular body including two spaced longitudinal slits extending for a portion of its length, at least one of said slits terminating at a point intermediate the ends of said tubular body, an integral portion of said tubular body intermediate said spaced slits being wrapped around said linear body into a gripping relationship therewith to prevent longitudinal movement of said tubular body.

3. The invention comprising a linear body, a tubular body adapted to be mounted in a co-axial relationship with said linear bodies, said tubular body having an internal diameter greater than the diameter of said linear body and including two spaced longitudinal slits extending for a portion of its length, at least one of said slits terminating at a point intermediate the ends of said tubular body, an integral portion of said tubular body intermediate said spaced slits being wrapped around said linear body into a tightly gripping relationship therewith to prevent longitudinal movement of said linear body.

4. The invention comprising a linear body, a tubular body mounted in co-axial relationship with said linear body, said tubular body including a first longitudinal slit extending throughout its length and a second longitudinal slit extending for a portion of the length of the tubular body to a point of termination intermediate the ends of said tubular body and spaced from said first longitudinal slit, the portion of said tubular body intermediate said slits being wrapped around said linear body into a tightly gripping relationship therewith so as to prevent longitudinal movement of said tubular body.

5. The combination comprising a linear body, and tubular body mounted in a co-axial relationship with a linear body, said tubular body including a first longitudinal slit extending throughout its length whereby said tubular body may be mounted on a suspended linear body from the side, said tubular body further including a second longitudinal slit spaced from the first slit and extending for a portion of the length of said tubular body to a point intermediate the ends of said tubular body, the portion of said tubular body intermediate said slits being helically formed to an internal diameter and pitch length to permit wrapping around said linear body into a gripping relationship therewith whereby movement of said tubular body relative to said linear body is prevented.

6. An appliance for linear bodies comprising a tubular body adapted to be mounted in a co-axial relationship with a linear body, said tubular body including a first longitudinal slit extending throughout its length to permit application of said tubular body to a suspended linear body from the side, said tubular body including a second longitudinal slit extending for a portion of its length to a point intermediate the ends of said tubular body and substantially parallel to said first slit, the portion of said tubular body intermediate said slits being helically formed and adapted to be wrapped around said linear body into a gripping relationship therewith whereby relative movement between said tubular body and said linear body is prevented, said intermediate portion being adapted to be flexed outwardly with respect to said tubular body so as to facilitate wrapping thereof around said linear body and being further adapted to be flexed inwardly so as to lie within said tubular body when wrapped around a linear body.

7. An appliance for linear bodies comprising a tubular body adapted to be mounted in a co-axial relationship with a linear body, said tubular body including a first longitudinal slit extending from one end to a point intermediate the ends of said tubular body and a second longitudinal slit spaced from said first slit and substantially parallel and co-extensive therewith, the portion of said tubular body intermediate said slits being helically formed and adapted to be wrapped around said linear body in a gripping relationship therewith whereby relative movement between said tubular body and said linear body is prevented.

8. An appliance for linear bodies comprising a tubular body adapted to be mounted in a co-axial relationship with a linear body, said tubular body including a first helical slit, extending throughout its length to permit application of said tubular body to a suspended linear body from the side, said tubular body including a second helical slit extending from one end of said tubular body to a point intermediate its ends in spaced relationship with said first slit, the portion of said tubular body intermediate said slits being helically formed to an internal diameter less than the external diameter of the linear body of association and being adapted to be wrapped around said linear body of association into a gripping relationship therewith whereby relative movement is prevented.

References Cited by the Examiner
UNITED STATES PATENTS
3,051,278   8/1962   Smythe _____ 52—147

RICHARD W. COOKE, Jr., *Primary Examiner.*